(12) United States Patent
Wilson et al.

(10) Patent No.: US 8,830,471 B2
(45) Date of Patent: Sep. 9, 2014

(54) MEASURING OPERATIONAL PARAMETERS IN AN ESP SEAL WITH FIBER OPTIC SENSORS

(71) Applicant: Baker Hughes Incorporated, Houston, TX (US)

(72) Inventors: Brown Lyle Wilson, Tulsa, OK (US); Earl Bruce Brookbank, Claremore, OK (US); Ketankumar K. Sheth, Tulsa, OK (US); Suresha R. O'Bryan, Cypress, TX (US); Steven K. Tetzlaff, Owasso, OK (US); Risa Rutter, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/971,293

(22) Filed: Aug. 20, 2013

(65) Prior Publication Data

US 2014/0168638 A1    Jun. 19, 2014

Related U.S. Application Data

(63) Continuation-in-part of application No. 13/314,010, filed on Dec. 7, 2011, now Pat. No. 8,537,364.

(51) Int. Cl.
*G01N 21/55* (2014.01)
*G01B 11/16* (2006.01)
*G01J 11/00* (2006.01)

(52) U.S. Cl.
CPC ...................... *G01J 11/00* (2013.01)

USPC .............................................. 356/445; 356/32

(58) Field of Classification Search
CPC ....... E21B 47/123; E21B 36/04; E21B 43/24; E21B 47/06; E21B 47/065; E21B 43/2401; E21B 17/028; E21B 36/001; E21B 36/02; E21B 43/243; E21B 43/26; E21B 41/0064; E21B 43/12; E21B 47/0006
See application file for complete search history.

(56) References Cited

U.S. PATENT DOCUMENTS

| | | | |
|---|---|---|---|
| 6,888,124 B1 | 5/2005 | Smith | |
| 6,913,079 B2 | 7/2005 | Tubel | |
| 7,208,855 B1 | 4/2007 | Floyd | |
| 2003/0236626 A1 | 12/2003 | Schroeder et al. | |
| 2004/0141420 A1 | 7/2004 | Hardage et al. | |
| 2007/0041019 A1 | 2/2007 | Schmidt | |
| 2007/0272406 A1 | 11/2007 | McCoy et al. | |
| 2009/0065202 A1 | 3/2009 | Brown et al. | |
| 2011/0002795 A1* | 1/2011 | Brookbank | ..................... 417/63 |
| 2011/0061862 A1* | 3/2011 | Loretz et al. | ............. 166/250.11 |
| 2011/0139447 A1 | 6/2011 | Ramos et al. | |
| 2012/0026482 A1 | 2/2012 | Dailey | |
| 2012/0073804 A1 | 3/2012 | Harman et al. | |
| 2012/0179378 A1* | 7/2012 | Duncan et al. | ..................... 702/8 |

* cited by examiner

*Primary Examiner* — Michael P Stafira
(74) *Attorney, Agent, or Firm* — Shawn Hunter

(57) ABSTRACT

A seal section for use in a wellbore electrical submersible pump and includes an optic fiber detection arrangement wherein one or more optic fiber sensors is used to detect an operational parameter associated with the seal section. The operational parameters can include temperature, vibration and pressure.

19 Claims, 5 Drawing Sheets

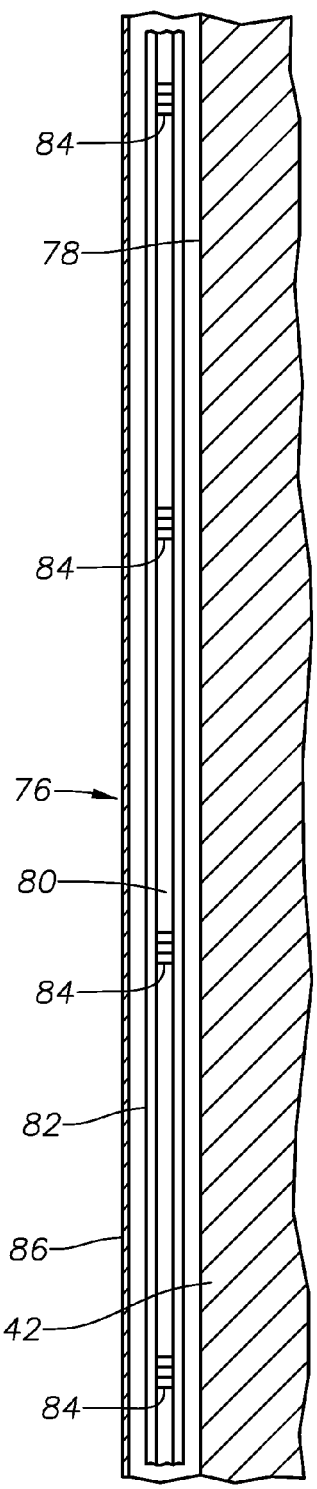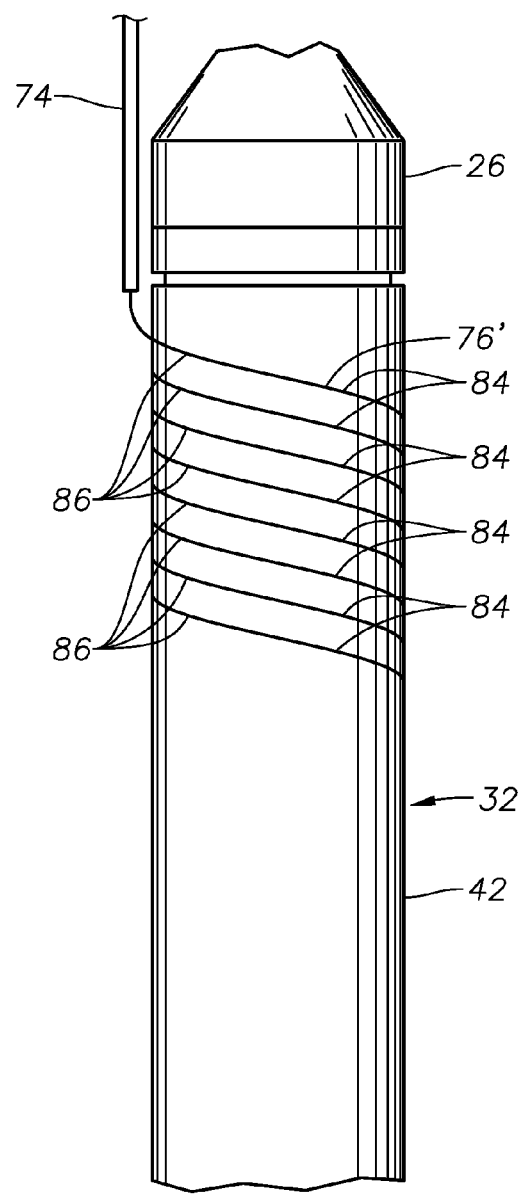

MEASURING OPERATIONAL PARAMETERS IN AN ESP SEAL WITH FIBER OPTIC SENSORS

BACKGROUND OF THE INVENTION

1. Field of the Invention

The invention relates generally to seal assemblies of the type that are used within electrical submersible pumps (ESP's) in wellbore. In particular aspects, the invention relates to techniques for monitoring operational parameters of such devices using fiber optics.

2. Description of the Related Art

Electrical submersible pumps (ESPs) are routinely used in the production of hydrocarbon from wells. A typical ESP includes a downhole motor that generates electric power used to operate a pump device. A seal assembly is typically provided between the motor and the pump. The seal includes an outer housing and a central shaft that is used to transmit torque from the motor to the pump. The seal equalizes fluid pressure so that the inside of the motor and seal are at equal pressure with the wellbore or outside environment. The seal usually provides a series of labyrinth or barrier chambers and mechanical face seals on its shaft to prevent or slow ingress of well fluids from the seal head to the motor. The seal also carries the pump down-thrust on a hydrodynamic thrust bearing so that it isn't transferred to the motor. In addition, the seal allows for motor oil thermal expansion and contraction and transfers shaft torque from the motor to the pump.

During operation, a seal assembly can be prone to failure or degradation in performance due to heating problems, component misalignment, differential pressures and so forth. Friction between the shaft and components within the housing of the seal may cause excessive heating in spots.

SUMMARY OF THE INVENTION

The present invention provides devices for detecting operational parameters associated with a seal assembly that is used in an ESP. The operational parameters that are detected can include temperature, pressure, and vibration. Optic fibers are used in conjunction with surface-based processing equipment that can record and store data provided by the optic fibers. In certain embodiments, optic fibers are used that provide for single point sensing or, alternatively, distributed multi-point sensing.

In described embodiments, optic fibers or fiber bundles are disposed within portions of a seal assembly or seal section, allowing for sensing of operational parameters during operation. In certain embodiments, optic fibers or fiber optic bundles are located on the radial exterior of the surface of the seal housing. The fiber is secured to the housing such that vibration is detected. In other embodiments, optic fibers are disposed within the housing of the seal section so that fluid characteristics can be detected, including flowrate or fluid contamination. In addition, vibration or proximity measurements can be made relating to bearings within the seal section.

A number of fiber optic methods are used to detect operational parameters associated with the seal section. In certain embodiments, Bragg gratings are formed at predetermined points along a fiber. Particular Bragg gratings are sensitive to changes in temperature while other Bragg gratings are sensitive to strain and can be used to measure vibration. In other embodiments, the distal axial end of a fiber can be used as a sensor to detect a selected parameter.

In preferred embodiments, optic fibers or fiber bundles that are incorporated into the seal section are incorporated into a fiber optic cable that leads to the surface of the well. The fiber optic cable is then associated with surface-based processing equipment which typically includes an optical time domain reflectometer.

BRIEF DESCRIPTION OF THE DRAWINGS

For a thorough understanding of the present invention, reference is made to the following detailed description of the preferred embodiments, taken in conjunction with the accompanying drawings, wherein like reference numerals designate like or similar elements throughout the several figures of the drawings and wherein:

FIG. 3 is a detail view depicting an optic fiber disposed upon the outer radial surface of the seal housing.

FIG. 4 is a side view of an exemplary seal section wherein an optic fiber is disposed around the seal section in a helical fashion.

DETAILED DESCRIPTION OF THE PREFERRED EMBODIMENTS

Figure 1:
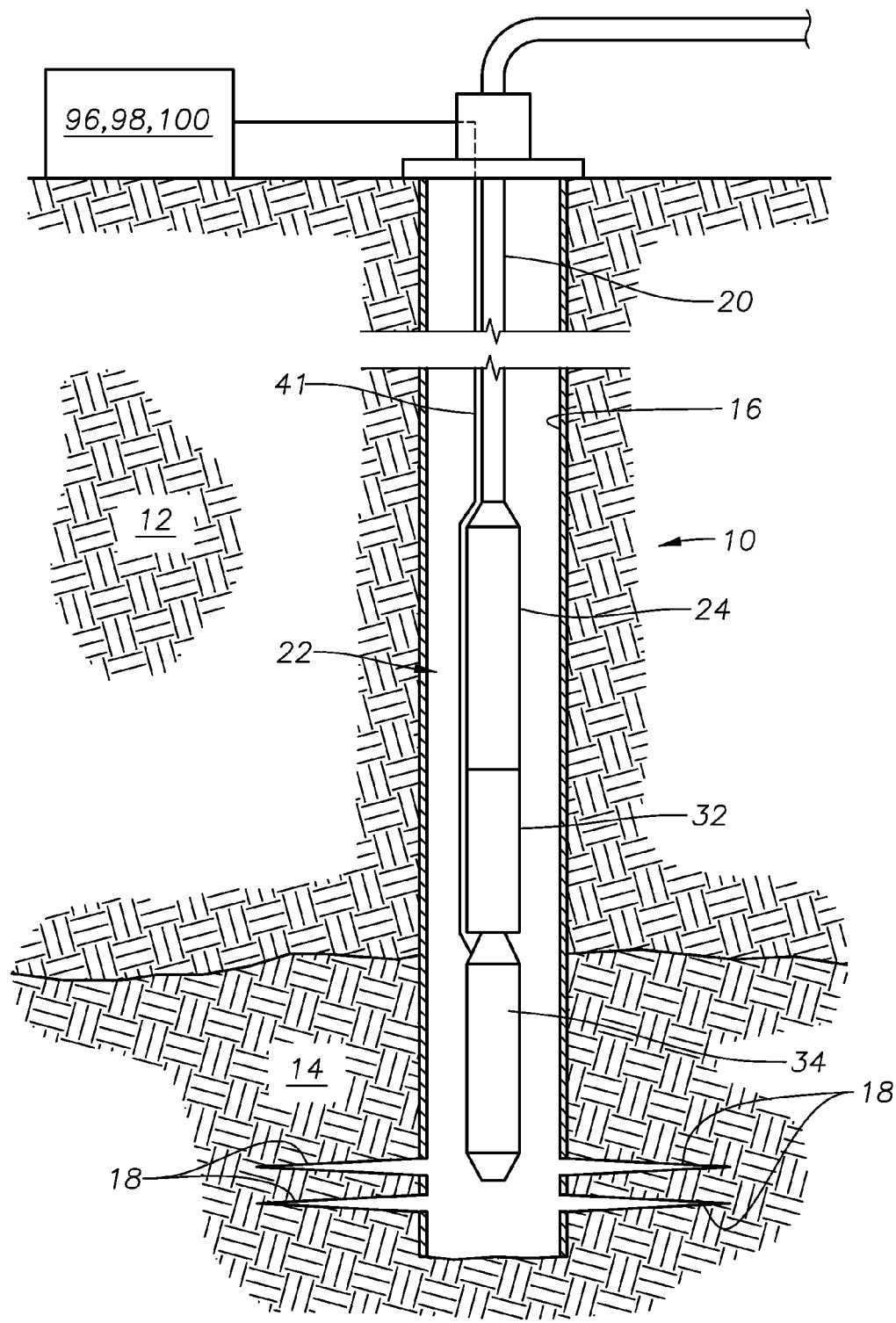
FIG. 1 is a side, cross-sectional view of an exemplary wellbore containing an electric submersible pump.

FIG. 1 depicts an exemplary wellbore 10 that has been drilled through the earth 12 down to a subterranean hydrocarbon formation 14. The wellbore 10 has metallic casing 16 of a type known in the art. Perforations 18 are disposed through the casing 16 and, into the formation 14.

Production tubing 20 is disposed within the wellbore 10, having been run in from the surface in a manner known in the art. The production tubing 20 may be a string of production tubing members that are interconnected by threaded or it may be coiled tubing. An electric submersible pump (ESP) assembly 22 is affixed to the lower end of the production tubing 20. The exemplary ESP assembly 22 includes a centrifugal pump 24 which is affixed at its lower end to either a seal 32 or a gas separator (not shown).

A seal section 32, of a type known in the art for fluid equalization, interconnects the lower end of the pump 24 to a motor 34. The motor 34 is of a type known in the art and may be a three-phase electrical motor. The seal section 32 is also of a type known in the art and is capable of equalizing the pressure of the lubricant contained within the motor 34 with well fluid on the exterior of motor 34. Fluid equalizing seal assemblies are described in U.S. Pat. No. 4,421,999 issued to Beavers et al.

Further details relating to the construction and operation of electric submersible pump assemblies and gas separators can be found in U.S. Patent Publication No. US 2009/0065202 which is owned by the assignee of the present application. U.S. Patent Publication No. US 2009/0065202 is hereby incorporated by reference in its entirety.

Figure 2:
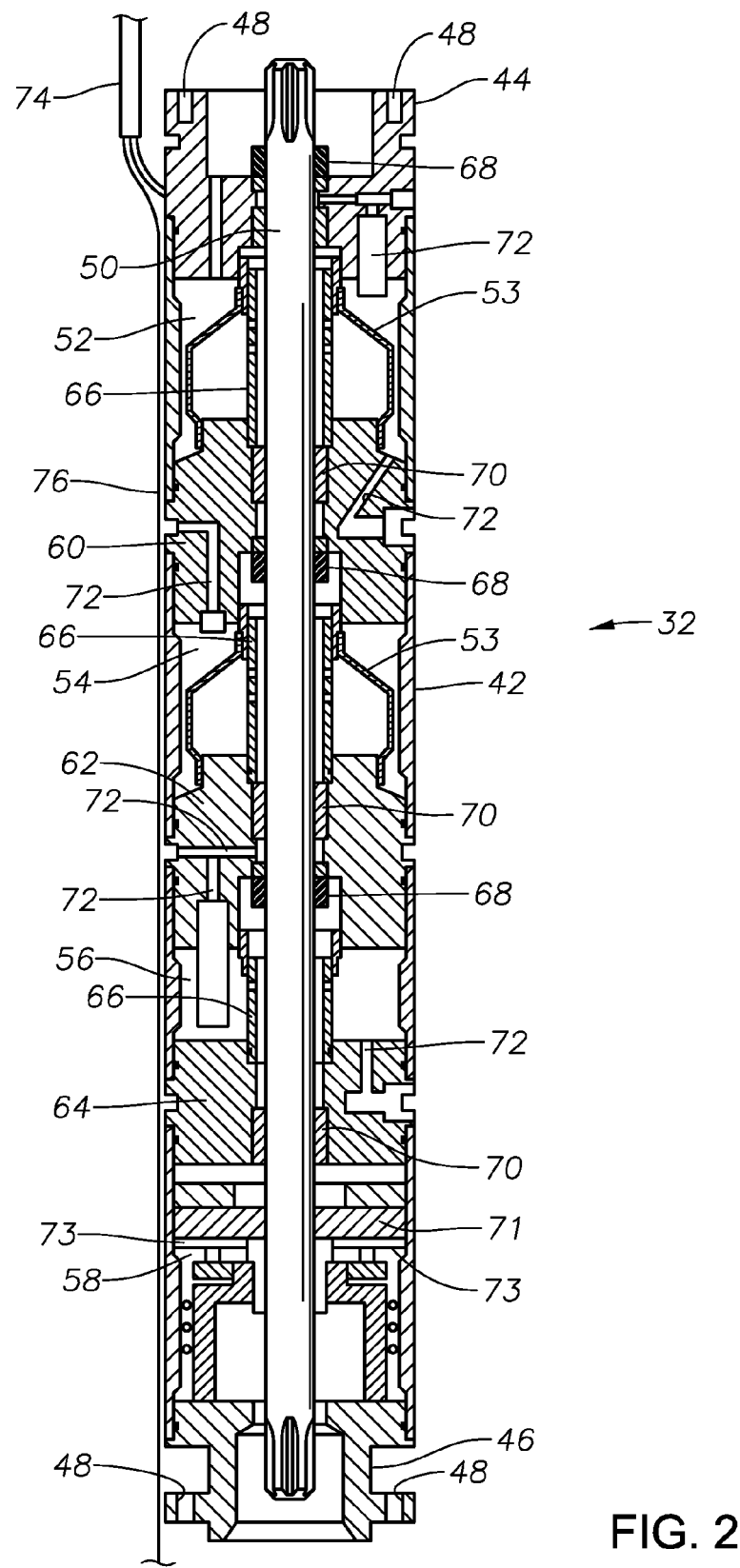
FIG. 2 is a side, cross-sectional view of an exemplary seal section used in the electric submersible pump shown in FIG. 1 and incorporating fiber optic sensors in accordance with the present invention.

FIG. 2 depicts internal portions of the seal section 32. The seal section 32 includes a generally cylindrical outer housing 42 having seal head 44 and seal base 46. The seal head and seal base 44, 46 include openings 48 for the placement of bolts or other connectors to permit the seal section 32 to be interconnected with the motor 34 and gas separator 26. A power transfer shaft 50 is retained within the housing 42 and is rotatable within about its longitudinal axis. The power transfer shaft 50 serves to transmit rotational forces between from the motor 34 below to the gas separator 26 and pump 24 above.

As details relating to the construction and operation of electric submersible pump seal assemblies are well known to those of skill in the art, they will not be discussed in significant detail herein. It is noted, however, that the seal section 32 depicted in FIG. 2 includes upper bag-type seal chambers 52 and 54. Each of the bag chambers 52, 54 includes a bag-type seal 53 which provides a physical barrier between well fluid and oil contained within the seal 53 and provides pressure equalization. The seal section 32 also includes a labyrinth-type seal chamber 56 defined within the housing 42. The labyrinth-type seal chamber 56 allows well fluid to come into contact with oil and works based upon the specific gravity difference between fluids. An oil circulation and cooling chamber 58 is also defined within the seal section 32. The chambers 52, 54, 56, 58 are separated from one another by bulkheads 60, 62, 64. The labyrinth and bag-type seal chambers 52, 54 and 56, as well as the mechanical seals 68 maintain motor fluid dielectrics by preventing or slowing down ingress of well fluids from the seal head 44 to the motor 34. It is noted that, depending upon the desired construction, a seal section might include any combination of bag-type seal chamber and/or labyrinth-type seal chambers or similar types of chambers known in the art, such as metal bellows type chambers.

Radial bearings 66 radially surround the shaft 50 and function to transfer axial thrust loads from the shaft 50 to bulkheads 60, 62, 64 within the seal section 32. The shaft 50 also carries a number of mechanical seals 68. Radial bearings 70 provide a rotational interface between the shaft 50 and the bulkheads 60, 62, 64. Labyrinth tubes 72 permit selective fluid transmission as well as pressure equalization between labyrinth chamber 56 and the exterior of the seal section 32. A thrust bearing 71 is located proximate the upper end of the oil circulation and cooling chamber 58. Thrust pads 73 support the thrust bearing 71. The thrust bearing 71 and thrust pads 73 largely carry the pump down-thrust so that it isn't transferred to the motor 34.

FIG. 2 also depicts a fiber optic cable 74 which extends downwardly into the wellbore 10 from surface. The fiber optic cable 74 is preferably armored or otherwise protected from wellbore fluids and from crushing or other damage. The fiber optic cable 74 a plurality of individual optic fibers that are used to detect operational parameters within or upon the seal section 32. A single optic fiber 76 is shown disposed upon the outer surface of the housing 42 of the seal section 32. Additional optic fibers are disposed within the seal section 32.

FIG. 3 illustrates the disposal of an exemplary optic fiber 76 along the outer radial surface 78 of the seal housing 42. The optic fiber 76 includes a core 80 that is radially surrounded by cladding 82. Bragg gratings 84 are formed on the core 80 of the fiber 76. As is known in the art, Bragg gratings 84 may be created using UV laser or UV light in conjunction with a specific photomask to form a particular grating pattern. As illustrated in FIGS. 2 and 3, the fiber 76 is disposed generally axially along the outer radial surface 78. Preferably, the fiber 76 is contained within a protective sheath 86 or tube. The protective sheath 86 is preferably secured to the surface 78.

Each Bragg grating 84 functions as a sensor that exhibits a particular resonance feature which is tracked as the fiber is subjected to strain or to temperature variations. Each Bragg grating 84 responds to a broadband optical signal (typically provided by the signal processor 112 depicted in FIG. 7) and further responds to the parameter being sensed, in order to provide a signal containing information about the parameter being sensed. As an optical pulse is provided to the fiber 76 by the signal processor 112, light is continuously backscattered as it propagates, as a result of Rayleigh scattering. The backscattered light is time-resolved by the signal processor 112 to provide a differential map of the spatial distribution of optical attenuation along the fiber 76. In embodiments wherein there are multiple Bragg gratings 84, a selected parameter can be measured at multiple, discrete points along the length of the fiber 76. In a particular exemplary embodiment, temperature is detected by each of the Bragg gratings 84 along the fiber 76, which will provide to an operator an indication of discrete hot spots along the axial length of the fiber 76. The use of multiple Bragg gratings 84 also allows the axial position of this heating to be determined as well.

According to an alternative embodiment, the Bragg gratings 84 are adapted to detect pressure or changes in pressure in the area proximate the fiber 76. The sensed data will provide an indication of the locations(s) of high pressure areas along the length of the fiber 76.

According to a further alternative embodiment, the Bragg gratings 84 are adapted to allow detection of strain on the fiber 76. Strain can be converted to pressure or vibration depending upon the calibration of the measurement equipment being used (i.e., a fiber optic signal processor). Discrete distributed point measurements of strain along the length of the fiber 76 can provide indications of vibration within the seal section 32 and provide the locations of excessive vibration within the seal section 32. The detection of these locations could reveal points of excessive vibration or the misalignment of components within the seal section 32, which could be subsequently corrected.

FIG. 4 depicts an alternative arrangement for optic fiber 76' wherein the fiber 76' is wrapped around the circumference of the seal section housing 42 in a helical manner such that there are multiple wraps 86. The fiber 76' would include Bragg gratings 84 of the type(s) described earlier. The Bragg gratings 84 could be located on sequential wraps 86, thereby providing sensing locations that are distributed axially along the housing 42. In addition, the Bragg gratings 84 could be spaced angularly to different locations around the circumference of the seal section 32 to allow detection of a particular operational parameter at different angular locations around the seal section 32. The fiber 76' can be used to detect temperature or pressure. Alternatively, the fiber 76' could be used to detect the locations of vibration via localized strain measurements provided by the Bragg gratings 84.

Figure 5:
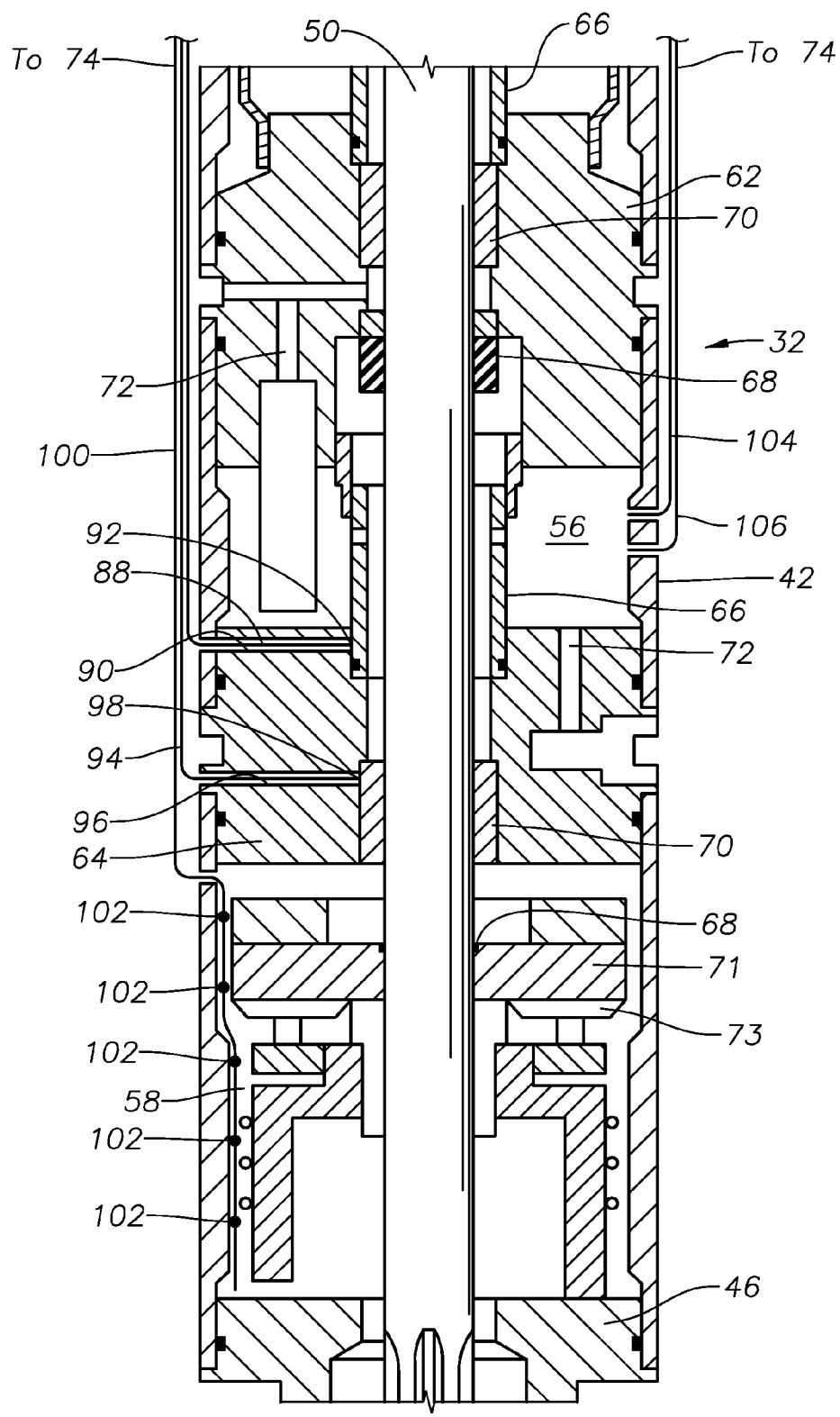
FIG. 5 is an enlarged cross-sectional view of portions of the seal section shown in FIG. 2.

FIG. 5 is an enlarged cross-sectional view of portions of the seal section 32 shown in FIG. 2. An optic fiber 88 is disposed through the housing 42 of the seal section and along channel 90 such that its axial end 92 is located proximate thrust bearing 66. In this instance, the axial end 92 of the fiber 88 is used as a sensor to detect an operational parameter. FIG. 5 depicts a fiber 88 being used to detect an operational parameter associated with a single radial bearing 66. It should be understood, however, that fibers may be provided to measure operational parameters associated with other radial bearings 66 within the seal section 32. Providing fibers for other radial bearings 66 would permit temperature, fluid pressure or other parameters to be detected in each of the chambers 52, 54, 56. If pressure within the chambers 52, 54, 56 is detected, an operator would be able to determine the changes in pressure within each chamber 52, 54, 56 over time to properly design or adjust the fluid flow paths through the seal section for proper equalization. In addition, pressure equalization issues during start up and shut down can be identified. Fluid pressure detected in each chamber 52, 54, 56 will indicate to an operator fluid expansion and contraction within them. Pressure sensing in these locations can also help an operator to detect a sudden decompression or the impact of differential pressures/temperatures n sealing points. In particular embodiments, the fiber 88 detects temperature or pressure. However, other fluid characteristics or attributes, such as flow rate or fluid contamination might also be detected.

FIG. 5 also depicts an optic fiber 94 which is disposed through the housing 42 of the seal section 32 and through channel 96 such that the axial end 98 of the fiber 94 is located proximate the radial bearing 70. It is noted that, while a fiber 94 is only depicted proximate a single radial bearing 70, there may be and preferably will be a similar fiber provided for each of the radial bearings 70 within the seal section 32. In preferred embodiments, the fiber 94 is used to detect proximity of the bearing 70 to the fiber axial end 98. In so doing, lateral or radial vibration of the radial bearing 70 can be detected and measured. An operator can monitor the condition of the radial bearings 70. Detection of temperature proximate each radial bearing 70 will permit monitoring of points of excessive friction resulting from the rotation of shaft 50 within the seal section housing 42.

According to a further aspect of the present invention, an optic fiber 100 is disposed through the housing 42 of the seal section 32 and is located proximate the upper end of chamber 58. The fiber 100 is adapted to detect the viscosity of fluid flowing through the chamber 58 of the seal section 32. It should be understood that other fibers similar to fiber 100 can be located within other portions of the seal section 32 to measure fluid viscosity as well. Viscosity can be inferred from measurement of water/moisture content within a fluid which can be detected using sensors 102 which are incorporated along the length of the fiber 100. Total internal reflection occurring at the core-cladding interface in an optic fiber provides an evanescent field in the cladding 82. This field presents an evanescent wave which propagates along the wave guide in the core 80 but which falls off exponentially in amplitude to a low value in a transverse distance of order one wavelength. The overall propagation of energy in the fiber is sensitive to evanescent wave absorption which occurs in the cladding 82.

Sensors 102 are incorporated into the fiber 100 at predetermined locations within the chamber 58. The sensors 102 may be created by removing the cladding 82 at the selected points and replacing it with a material whose absorption or fluorescence spectrum is sensitive to the absorption of an external chemical species. In one embodiment, approximately 50 cm sections of cladding 82 are removed and replaced by a gelatin film containing cobalt chloride. The salt changes color from blue to pink upon absorption of moisture, thus providing an indicator of relative humidity/moisture content. In particular embodiments, the absorption can be monitored at a wavelength of 670 nm and the signal normalized with respect to a backscattered signal at 850 nm which is unaffected by the color change.

Figure 6:
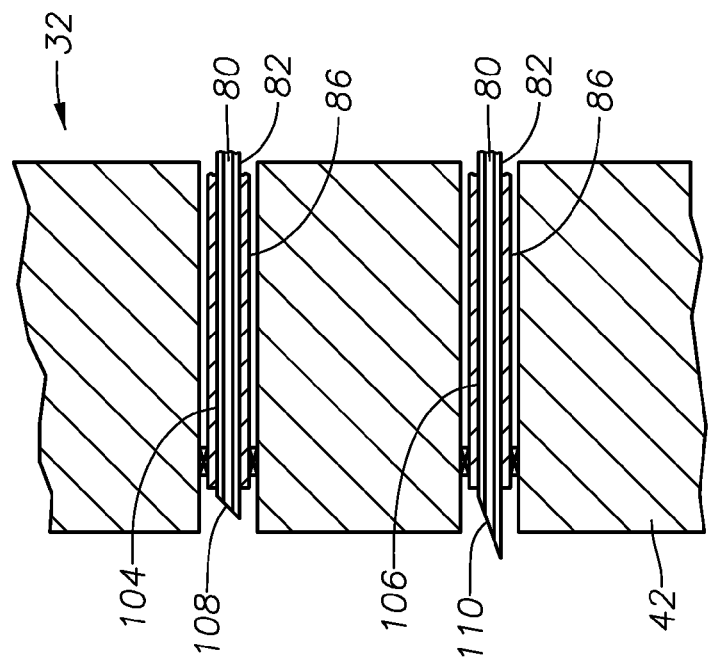
FIG. 6 is an enlarged side cross-section depicting optic fiber ends.

FIG. 5 also depicts the use of oblique tip fiber optic sensors to measure fluid presence and viscosity or otherwise discriminate between flow of various fluids within the seal section 32. Optic fibers 104 and 106 are disposed through seal section housing 42. The fibers 104, 106 are depicted in greater detail in FIG. 6. The fibers 104, 106 are provided with axial ends 108, 110, respectively, that are each at an oblique angle to the axis of the fiber 104 or 106. Each of the axial ends 108, 110 is preferably hard coated and wetted with fluid film. Oil is a preferred wetting film. The end 108 of fiber 104 is formed at an oblique angle of about 45 degrees. A silica fiber with an end face having an angle of about 45 degrees will provide 100% reflection when in gas and less than 1% reflection when disposed in oil or water. Thus, this fiber 104 can be used as a high contrast gas/liquid discriminator.

The end 110 of fiber 106 is formed at an oblique angle of about 73 degrees. A fiber with an end face having an angle of about 73% functions as a high contrast oil/non-oil discriminator, as the reflectivity becomes 100% when the fiber 106 is in gas or water and below 1% when in oil. If data from both fibers 104 and 106 is used together, three-phase discrimination of fluids can be achieved.

Other optical sensing techniques known in the art could also be used to detect the nature and attributes of fluids within the seal section 32 and, thereby provide data to an operator which would permit the deduction of information relating to the viscosity of fluids within the seal section 32 or the presence of contamination of fluids within the seal section or portions thereof. Near infrared attenuation ("NIR") relies on differences in the opacity of oil and water to the transmission of infrared light. Crude oil is composed of longer hydrocarbon chains and aromatics, such as $CH_2$ while natural gas consists of predominantly methyl groups (i.e., $CH_3$). Each radical has a distinctive near infrared attenuation absorption band,. Therefore, it is possible to distinguish natural gas from crude oil based upon absorption level. Light from a broadband source, such as fiber optic signal processor 112, covering the near infrared wavelength range of around 1000 to about 1700 nm is transmitted along an optic fibers to a reflectance probe, of a type known in the art, which is immersed in fluid. Alternatively, induced fluorescence measurements could, be used to determine the presence and attributes of oil, water, gas within portions of the seal section. Any or all of the above-described techniques could be used to allow an operator to determine flow characteristics for fluids moving through the seal section 32, such as flowrate and intrusion of undesirable fluids or particles (i.e., contamination).

Figure 7:
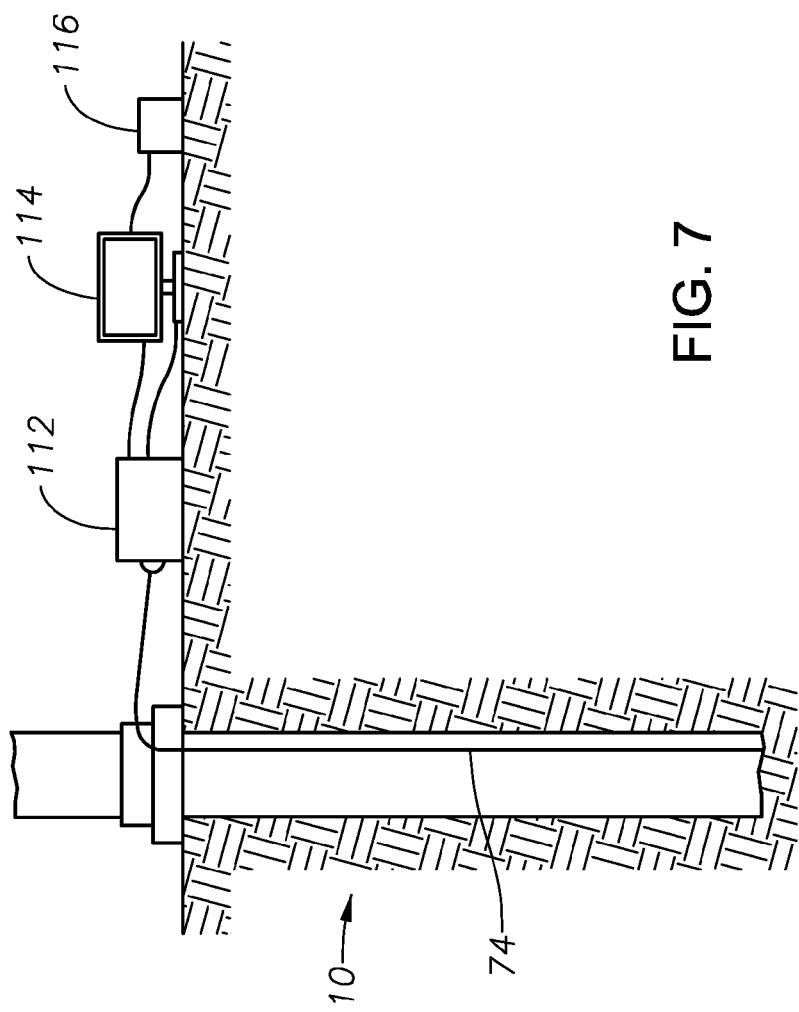
FIG. 7 illustrates surface-based equipment that is operably associated with fiber optic sensors.

FIG. 7 illustrates exemplary surface-based equipment to which the fiber optic cable 74 might be routed. The fiber optic cable 74 is operably interconnected with a fiber optic signal processor 112. In some embodiments, a suitable display 114 and recording device 116 are also associated with the signal processor 112. Generally, the fiber optic signal processor 112 includes a computer or microprocessor chip that is programmed to analyze an optical signal and send information relating to the optical signal to recordable storage in the recording device 116. The fiber optic signal processor 112 typically includes an optical time-domain reflectometer (OTDR) which is capable of transmitting optical pulses into the fiber optic cable 74 and analyzing the light that is returned, reflected or scattered therein. Changes in an index of refraction in optic fibers can define scatter or reflection points. Analyzing the collected return light can yield the distance to changes in the index of refraction. Thus, the OTDR can be used to detect the locations of sensed operating parameters along the length of the optic fibers that are carried within the fiber optic cable 74.

It should be appreciated that the invention provides devices that allow monitoring of operational parameters of a subsurface seal section, especially in high temperature applications. The inventors have found that fiber optics are relatively insensitive to temperature and electromagnetic interference and have a small footprint and high accuracy. In particular aspects, the invention provides improved seal sections or seal assemblies that can be used in an electric submersible pump and which provide the capability of monitoring operational parameters of the seal section during operation. In other aspects, the invention provides methods for detecting an operational parameter of a pressure-equalizing seal section for an electric submersible pump wherein the optic fiber of an optic fiber sensing arrangement is operably associated with the seal section to detect the parameter and provide a signal indicative thereof to a fiber optic signal processor.

Those of skill in the art will recognize that numerous modifications and changes may be made to the exemplary designs and embodiments described herein and that the invention is limited only by the claims that follow and any equivalents thereof.

What is claimed is:

1. A seal section for use in pressure equalization in an electric submersible pump, the seal section comprising:
   an outer housing defining a plurality of fluid-equalizing labyrinth chambers that are axially separated from each other by at least one bulkhead;
   a power transfer shaft retained by the housing and rotatable within to transmit rotational force from a motor section to a pump section within the electric submersible pump;
   an optic fiber associated with the seal section to detect an operational parameter associated with the seal section; and
   the optic fiber is disposed through the housing of the seal section.

2. The seal section of claim 1 wherein the operational parameters include at least one of the parameters from the group consisting of: temperature, pressure, vibration, proximity, viscosity, and fluid contamination.

3. The seal section of claim 1 wherein the optic fiber is operably associated with a fiber optic signal processor which is capable of transmitting optical pulses into the optic fiber and analyzing the light that is returned, reflected or scattered therein.

4. The seal section of claim 1 wherein the optic fiber has an axial length and includes one or more Bragg gratings for detection of the operational parameter at a point along the axial length of the fiber.

5. The seal section of claim 4 wherein the optic fiber is disposed upon the radial exterior of the seal section.

6. The seal section of claim 1 wherein:
   an axial end of the optic fiber is used to detect the operational parameter.

7. The seal section of claim 1 wherein:
   the optic fiber is disposed through the housing of the seal section; and
   a Bragg grating upon the optic fiber is used to detect the operational parameter.

8. The seal section of claim 6 wherein the axial end of the optic fiber is located proximate a bearing within the seal section.

9. A seal section for use in pressure equalization in an electric submersible pump, the seal section comprising:
   an outer housing defining a plurality of fluid-equalizing labyrinth chambers that are axially separated from each other by at least one bulkhead;
   a power transfer shaft retained by the housing and rotatable within to transmit rotational force from a motor section to a pump section within the electric submersible pump; and
   a fiber optic sensing arrangement to detect at least one operational parameter associated with the seal section, the fiber optic sensing arrangement having an optic fiber that is disposed through the housing of the seal section.

10. The seal section of claim 9 wherein the fiber optic sensing arrangement comprises:
    a fiber optic signal processor; and
    the optic fiber is operably associated with the fiber optic signal processor to provide to the fiber optic signal processor a signal indicative of the operational parameter.

11. The seal section of claim 9 wherein the operational parameters include at least one of the parameters from the group consisting of: temperature, pressure, vibration, proximity, viscosity, and fluid contamination.

12. The seal section of claim 10 wherein the optic fiber has an axial length and includes one or more Bragg gratings for detection of the operational parameter at a point along the axial length of the fiber.

13. The seal section of claim 10 wherein the optic fiber is disposed upon the radial exterior of the seal section.

14. The seal section of claim 10 wherein:
    an axial end of the optic fiber is used to detect the operational parameter.

15. The seal section of claim 10 wherein:
    a Bragg grating upon the optic fiber is used to detect the operational parameter.

16. The seal section of claim 14 wherein the axial end of the optic fiber is located proximate a bearing within the seal section.

17. A method for detecting an operational parameter of a pressure-equalizing seal section for an electric submersible pump, the method comprising the steps of:
    providing a fiber optic sensing arrangement having a fiber optic signal processor and an operably associated optic fiber to provide a signal to the fiber optic signal processor that is indicative of a sensed operational parameter;
    disposing the optic fiber through a housing of the seal section; and
    operably associating the optic fiber with the seal section so that the optic fiber senses the operational parameter.

18. The method of claim 17 wherein:
    the seal section presents an exterior surface; and
    the optic fiber is disposed upon the exterior surface of the seal section to detect the operational parameter.

19. The method of claim 17 wherein the operational parameters include at least one of the parameters from the group consisting of: temperature, pressure, vibration, proximity, viscosity, and fluid contamination.

* * * * *